(No Model.)

A. ATKINSON.
APPARATUS FOR THE MANUFACTURE OF STARCH.

No. 253,337. Patented Feb. 7, 1882.

WITNESSES:
Donn Twitchell
C. Sedgwick

INVENTOR:
A. Atkinson
BY Munn & Co
ATTORNEYS.

UNITED STATES PATENT OFFICE.

ANTHONY ATKINSON, OF NEW YORK, N. Y.

APPARATUS FOR THE MANUFACTURE OF STARCH.

SPECIFICATION forming part of Letters Patent No. 253,337, dated February 7, 1882.

Application filed September 15, 1881. (No model.)

*To all whom it may concern:*

Be it known that I, ANTHONY ATKINSON, of the city, county, and State of New York, have invented a new and useful Improvement in Apparatus for the Manufacture of Starch, of which the following is a full, clear, and exact specification.

In the manufacture of starch the final settling operation is accomplished in long troughs or tanks, through which the starch-water is run, so that the starch may settle while the water escapes at the discharge end of the trough.

My invention relates to such troughs, and the object is to obviate the difficulty experienced from the uneven accumulation of starch, prevent waste of starch, and to insure a uniform current.

The invention consists in adjustable dams or gates, which are combined with the settling-troughs, as hereinafter described and claimed.

Reference is to be had to the accompanying drawings, forming part of this specification, in which similar letters of reference indicate corresponding parts in all the figures.

Figure 1:
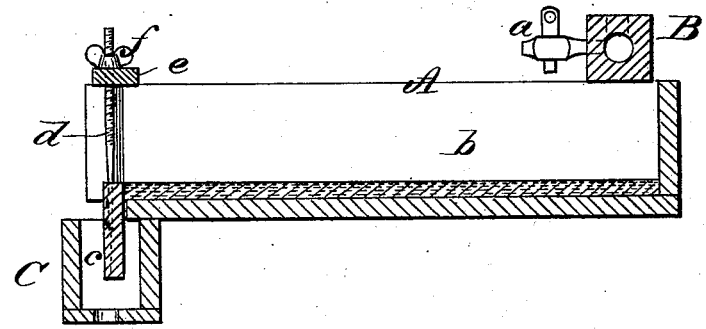
Figure 2:
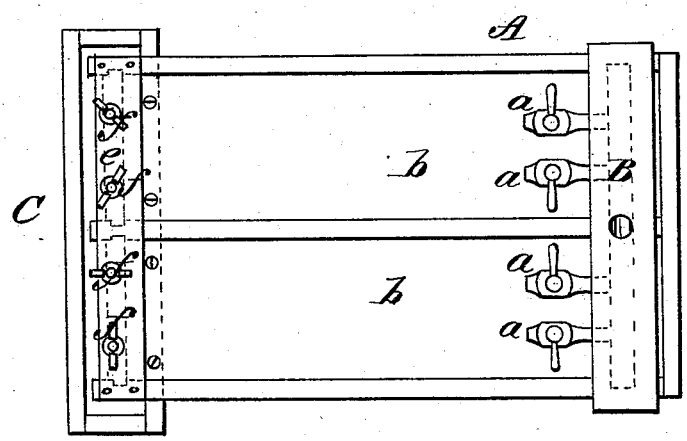

Figure 1 is a vertical longitudinal section of a settling-trough fitted with my improvement, and Fig. 2 is a plan view of the same.

A is a trough, divided, as usual, by a longitudinal partition to form separate runs *b b*.

B is a pipe supplying the liquid placed over one end of the trough, and provided with faucets *a a*, for delivery of the liquid in quantity as required.

C is an open spout, placed beneath the lower open end of the trough A to receive and carry off the water.

At the lower end of each run *b* is a gate or dam, *c*, fitted to slide vertically in grooves formed in the sides of the trough. To these gates are connected screw-rods *d*, that extend through a bar, *e*, fixed on the trough above, and on the screws above the bar are nuts *f*, by which the gates are to be raised and held. By this construction the gates or dams can be lowered into the spout C below the level of the trough-bottom or raised above the bottom more or less, as required.

It is to be understood that the trough-bottom is level or slightly inclined, as required, to cause the liquid to flow slowly, so that the starch may separate and settle. Naturally the accumulation is greatest at the upper end and diminishes gradually to the lower end, thus causing an increase in the rapidity of current and preventing the starch from depositing. To avoid that effect the gates *c* are raised slightly from time to time as the deposit increases in depth to form dams at the ends of the runs, and the starch is thus caused to settle to a level surface. This may be continued until the work ceases or the tanks are filled, when the gates are to be lowered and the starch removed. In that manner waste of starch is prevented, and the operation can be continued for a longer time before the starch is required to be removed.

Having thus fully described my invention, I claim as new, and desire to secure by Letters Patent—

1. The combination, with starch-troughs, of adjustable gates or dams, substantially as shown and described.

2. The adjustable gates *c*, combined with trough A, substantially in the manner and for the purposes set forth.

3. The combination of trough A, spout C, sliding gates *c*, and adjusting-screws *d*, substantially as shown and described, for the purpose specified.

ANTHONY ATKINSON.

Witnesses:
   GEO. D. WALKER,
   C. SEDGWICK.